(12) United States Patent
Konishiike et al.

(10) Patent No.: US 9,425,441 B2
(45) Date of Patent: *Aug. 23, 2016

(54) ANODE AND BATTERY

(75) Inventors: Isamu Konishiike, Fukushima (JP); Kensuke Yamamoto, Fukushima (JP); Tomoo Takada, Fukushima (JP); Yukiko Iijima, Fukushima (JP); Kenichi Kawase, Fukushima (JP); Yukio Miyaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 994 days.

This patent is subject to a terminal disclaimer.

(21) Appl. No.: 11/039,321

(22) Filed: Jan. 20, 2005

(65) Prior Publication Data

US 2005/0191547 A1   Sep. 1, 2005

(30) Foreign Application Priority Data

Jan. 28, 2004 (JP) ................ P2004-019795

(51) Int. Cl.
*H01M 4/04* (2006.01)
*H01M 4/38* (2006.01)
*H01M 2/02* (2006.01)
(Continued)

(52) U.S. Cl.
CPC ............ *H01M 2/0222* (2013.01); *H01M 4/134* (2013.01); *H01M 4/1395* (2013.01); *H01M 4/36* (2013.01); *H01M 4/366* (2013.01); *H01M 4/38* (2013.01); *H01M 4/58* (2013.01); *H01M 4/62* (2013.01); *H01M 4/667* (2013.01); *H01M 10/0431* (2013.01); *H01M 10/0436* (2013.01); *H01M 10/052* (2013.01); *H01M 4/0404* (2013.01); *H01M 4/0471* (2013.01); *H01M 4/66* (2013.01); *H01M 10/446* (2013.01);
(Continued)

(58) Field of Classification Search
None
See application file for complete search history.

(56) References Cited

U.S. PATENT DOCUMENTS 6,096,454 A * 8/2000 Tran et al. .................. 429/231.8
7,226,700 B2 * 6/2007 Takada et al. ............... 429/244
(Continued)

FOREIGN PATENT DOCUMENTS

JP    02-168562    6/1990
JP    06-124700    5/1994
(Continued)

OTHER PUBLICATIONS

Hong Gan et al., "Lithium electrodes with and without CO2 treatment: electrochemical behavior and effect on high rate lithium battery performance," J. Power Sources 62(1996), 45-50.*
European Search Report dated Feb. 19, 2007.
Communication from European Patent Office for European Application No. 05001209.5-2119 / 1562250 dated Nov. 27, 2012.

*Primary Examiner* — Jonathan Crepeau
(74) *Attorney, Agent, or Firm* — Dentons US LLP (57) ABSTRACT

Provided are an anode capable of preventing an increase in impedance and variations in characteristics and a battery using the anode. An anode active material layer includes at least one kind selected from the group consisting of simple substances, alloys and compounds of silicon and the like capable of forming an alloy with Li. The anode active material layer is formed by a vapor-phase deposition method or the like, and is alloyed with an anode current collector. A coating including lithium carbonate is formed on at least a part of a surface of the anode current collector. Thereby, an increase in impedance can be prevented. Moreover, the anode is less subject to an influence by a difference in a handling environment or storage conditions, so variations in impedance can be prevented.

8 Claims, 3 Drawing Sheets

(51) Int. Cl.

| | | |
|---|---|---|
| *H01M 4/134* | (2010.01) | |
| *H01M 4/1395* | (2010.01) | |
| *H01M 4/36* | (2006.01) | |
| *H01M 4/58* | (2010.01) | |
| *H01M 4/62* | (2006.01) | |
| *H01M 10/04* | (2006.01) | |
| *H01M 10/052* | (2010.01) | |
| *H01M 4/66* | (2006.01) | |
| *H01M 10/44* | (2006.01) | |
| *H01M 4/02* | (2006.01) | |

(52) U.S. Cl.
CPC . *H01M2004/027* (2013.01); *H01M 2300/0085* (2013.01); *Y02E 60/122* (2013.01)

(56) References Cited

U.S. PATENT DOCUMENTS

| | | | |
|---|---|---|---|
| 2002/0012846 A1 | 1/2002 | Skotheim et al. | |
| 2002/0086215 A1* | 7/2002 | Tamura et al. | 429/245 |
| 2003/0175583 A1* | 9/2003 | Suzuki | 429/57 |
| 2004/0166409 A1* | 8/2004 | Takada et al. | 429/218.1 |

FOREIGN PATENT DOCUMENTS

| | | |
|---|---|---|
| JP | 11-067208 | 3/1999 |
| JP | 2002-93411 | 3/2002 |
| JP | 2004-171875 | 6/2004 |
| JP | 2005-150039 | 6/2005 |
| JP | 2005-166469 | 6/2005 |
| WO | 03/023879 | 3/2003 |

\* cited by examiner

ANODE AND BATTERY

RELATED APPLICATION DATA

The present application claims priority to Japanese Application(s) No(s). P2004-019795 filed Jan. 28, 2004, which application(s) is/are incorporated herein by reference to the extent permitted by law.

BACKGROUND OF THE INVENTION

1. Field of the Invention

The present invention relates to an anode comprising an anode current collector and an anode active material layer, and a battery using the anode.

2. Description of the Related Art

In recent years, as mobile devices have higher performance and more functions, higher capacities of secondary batteries as power sources of the mobile devices have been desired. As a secondary battery which meets the requirement, a lithium secondary battery is cited. However, the battery capacity of a currently typical lithium secondary battery which uses lithium cobalt oxide as a cathode and graphite as an anode has reached a point of saturation, so it is extremely difficult to substantially increase the capacity of the lithium secondary battery. Although an anode using lithium (Li) metal has been studied since a long time ago, in order to put the anode to practical use, it is required to improve lithium precipitation/dissolution efficiency and control dendritic precipitation.

On the other hand, a secondary battery using an anode with a high capacity which uses silicon (Si), germanium (Ge), tin (Sn) or the like has been actively studied recently. However, when charge and discharge are repeated, the anode with a high capacity is broken into small pieces due to severe expansion and shrinkage of an active material, thereby a current collecting property declines, or the decomposition of an electrolyte solution is accelerated due to an increase in a surface area, thereby cycle characteristics are extremely poor. Therefore, when an anode formed through forming an active material layer on a current collector by a vapor-phase deposition method, a liquid-phase deposition method, a sintering method or the like is used, the anode can be prevented from being broken into small pieces, compared to a conventional coating type anode formed through applying slurry including a particulate active material, a binder and the like to a current collector, and the current collector and the active material layer can be formed as one unit. Therefore, the electronic conductivity in the anode is extremely superior, and higher performance in terms of capacity and cycle lifespan is expected. Moreover, an electronic conductor, a binder and voids which are present in a conventional anode can be reduced or eliminated, so the anode can be formed into a thin film in essence.

However, even in the anode, the cycle characteristics are not sufficient because of a nonreversible reaction of an active material according to charge and discharge. Moreover, as in the case of a conventional anode with a high capacity, the reactivity with an electrolyte is still high, so the capacity largely declines due to a reaction with the electrolyte according to charge and discharge especially in the early stages of cycles. Further, in the anode with a high capacity, an anode potential is largely increased according to extraction of lithium especially in the late stages of discharge, which is one of factors causing a decline in characteristics.

In order to overcome the problems, a method of inserting lithium related to a battery reaction into the anode in advance is considered. For example, an anode in which lithium is inserted into an anode material made of silicon or germanium with an ion injector in advance (refer to Japanese Unexamined Patent Application Publication No. 2002-93411), and a battery in which a cathode and an anode are formed in a state where alkali metal ions can be inserted, and the cathode and the anode are brought into contact with a dispersant formed through dispersing an alkali metal in an organic solvent including a compound capable of being solvated or forming a complex with alkali metal ions to insert the alkali metal into the battery (refer to Japanese Unexamined Patent Application Publication No. Hei 11-219724) have been reported. Moreover, in a conventional lithium-ion secondary battery using carbon for an anode, a large number of techniques of inserting a predetermined amount of lithium into the anode in advance have been reported. For example, an anode using particles with a structure in which lithium metal layer and a carbon layer are alternately laminated (refer to Japanese Unexamined Patent Application Publication No. Hei 7-326345), an anode in which a thin film made of transition metal chalcogen compound or a carbon material electrochemically supports an alkali metal (refer to Japanese Patent No. 3255670), an anode in which lithium metal foil is affixed to disperse and retain lithium in a carbon material (refer to Japanese Patent No. 3063320), an anode in which lithium is introduced through injecting an electrolyte solution to establish a short circuit between lithium metal and a carbon material (refer to Japanese Unexamined Patent Application Publication No. Hei 10-270090), a lithium secondary battery in which aromatic hydrocarbon forming a complex with a lithium metal is added to an anode in which a short circuit is established between a carbon material and lithium metal (refer to Japanese Unexamined Patent Application Publication No. Hei 11-185809) and a lithium secondary battery comprising a supply member made of a lithium metal housed in a battery case so as not to electrically make contact with an anode (refer to Japanese Unexamined Patent Application Publication No. 2001-297797) have been reported.

However, the anode into which lithium is inserted in advance is in a charge state, so the anode is in a active state, thereby the surface of the anode is oxidized to form a coating of lithium oxide or lithium hydroxide. The coating causes an increase in impedance in the battery and degradation in battery characteristics. Moreover, depending upon the thickness of the formed coating, the impedance in the battery differs, so even in batteries with the same structure, the thickness of the formed coating differs depending upon a handling environment and storage conditions, so variations in characteristics between each battery occurs.

SUMMARY OF THE INVENTION

In view of the foregoing, it is an object of the invention to provide an anode capable of preventing an increase in impedance in a battery and variations in characteristics, and a battery using the anode.

An anode according to the invention comprises: an anode current collector; an anode active material layer being disposed on the anode current collector and being alloyed with the anode current collector in at least a part of an interface with the anode current collector; and a coating including lithium carbonate on at least a part of a surface of the anode active material layer.

A battery according to the invention comprises: a cathode; an anode; and an electrolyte, wherein the anode comprises: an anode current collector; an anode active material layer being disposed on the anode current collector and being alloyed with the anode current collector in at least a part of an interface with the anode current collector; and a coating including lithium carbonate on at least a part of a surface of the anode active material layer.

In the anode according to the invention, a coating including lithium carbonate is included on at least a part of a surface of the anode active material layer, so the amount of lithium oxide or lithium hydroxide formed on the surface of the anode active material layer can be reduced, and when the anode is applied to the battery according to the invention, an increase in impedance in the battery can be prevented. Moreover, the anode is less subject to an influence by a difference in a handling environment or storage conditions, so variations in impedance can be prevented.

Specifically, when lithium is inserted into the anode active material layer, in the early stages of cycles, the consumption of lithium by a reaction with an electrolyte solution can be prevented, and even if lithium is consumed, lithium can be refilled, and degradation in the early stages can be prevented. Moreover, a stress on the anode current collector due to expansion and shrinkage of the anode active material layer according to charge and discharge can be reduced. Further, when electrically active lithium remains in the anode after discharge, an increase in the potential of the anode in the late stages of discharge can be prevented, and degradation according to an increase in the potential of the anode can be prevented. Therefore, battery characteristics such as cycle characteristics can be improved.

Moreover, when lithium is inserted through depositing lithium metal by a vapor-phase deposition method, lithium can be inserted in a process of depositing lithium metal, so handling can be easier. Further, the amount of lithium to be inserted can be easily controlled, and lithium can be uniformly inserted in a large area. Moreover, in the case where the anode active material layer is formed by a vapor-phase deposition method, a step of forming a film of the anode active material and a step of inserting lithium can be successively carried out, so manufacturing steps can be simplified.

In addition, when the coating including lithium carbonate is formed through inserting lithium into the anode active material layer, and then bringing the anode active material layer into contact with carbon dioxide, lithium is diffused over the anode active material layer, and alloyed with the anode active material layer, so compared to lithium metal, the surface of the anode active material layer is less active, and the thickness and variations of the coating can be reduced. Therefore, an increase in impedance in the battery and variations in characteristics can be prevented.

Further, when the anode active material layer includes at least one kind selected from the group consisting of simple substances, alloys and compounds of silicon, germanium and tin, a higher capacity can be obtained, and a loss in the capacity due to insertion of lithium in advance can be reduced. Further, when lithium is inserted, dangling bonds existing in the anode active material layer or impurities such as hydrogen and oxygen can be reduced, so battery characteristics such as cycle characteristics can be improved.

Other and further objects, features and advantages of the invention will appear more fully from the following description.

DETAILED DESCRIPTION OF THE PREFERRED EMBODIMENTS

A preferred embodiment of the present invention will be described in more detail below referring to the accompanying drawings.

Figure 1:
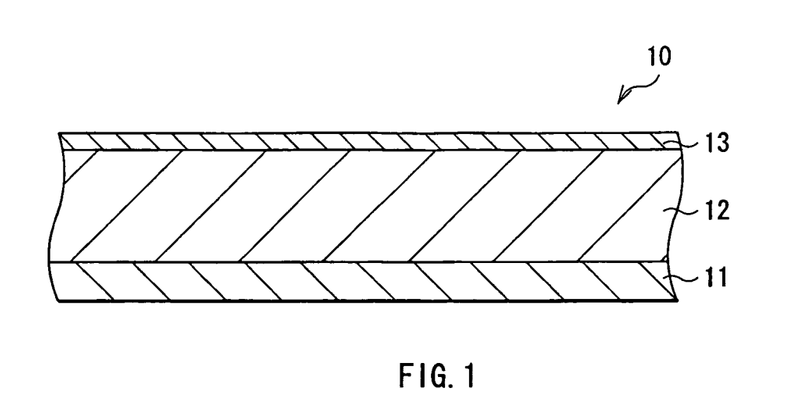
FIG. 1 is a sectional view of an anode according to an embodiment of the invention.

FIG. 1 shows a schematic structure of an anode according to an embodiment of the invention. An anode 10 comprises, for example, an anode current collector 11 and an anode active material layer 12 disposed on the anode current collector 11. The anode active material layer 12 may be formed on one side or both sides of the anode current collector 11.

The anode current collector 11 preferably includes, for example, a metal material including at least one kind selected from metal elements which does not form an intermetallic compound with lithium. It is because when the element forms an intermetallic compound with lithium, the anode current collector 11 expands and shrinks according to charge and discharge, thereby structural disorder is produced, so a current collecting property declines, and an ability of the anode current collector to support the anode active material layer 12 is reduced, thereby the anode active material layer 12 easily falls off the anode current collector 11. In the description, the metal material includes not only simple substances of metal elements but also an alloy including two or more kinds of metal elements, or one or more kinds of metal elements and one or more kinds of metalloid elements. As the metal element which does not form an intermetallic compound with lithium, for example, copper (Cu), nickel (Ni), titanium (Ti), iron (Fe) or chromium (Cr) is cited.

Among them, a metal element which is alloyed with the anode active material layer 12 is preferable. As will be described later, when the anode active material layer 12 includes at least one kind selected from the group consisting of simple substances, alloys and compounds of silicon, germanium and tin which are alloyed with lithium, the anode active material layer 12 largely expands and shrinks according to charge and discharge, thereby the anode active material layer 12 easily falls off the anode current collector 11; however, when the anode active material layer 12 is alloyed with the anode current collector 11 to firmly bond them together, the anode active material layer 12 can be prevented from falling off the anode current collector 11. As a metal element which does not forming an intermetallic compound with lithium and is alloyed with the anode active material layer 12, for example, a metal element alloyed with at least one kind selected from the group consisting of simple substances, alloys and compounds of silicon, germanium and tin, copper, nickel and iron are cited. Specifically, in terms of alloying with the anode active material layer 12, the strength and conductivity, copper, nickel or iron is preferable.

The anode current collector 11 may have a single layer or a plurality of layers. In the case where the anode current collector 11 has a plurality of layers, a layer making contact with the anode active material layer 12 may be made of a metal material being alloyed with at least one kind selected from the group consisting of simple substances, alloys and compounds of silicon, germanium and tin, and other layers may be made of any other metal material. Moreover, the anode current collector 11 is preferably made of a metal material including at least one kind selected from metal elements which does not form an intermetallic compound with lithium, except for an interface with anode active material layer 12.

The anode active material layer 12 includes, for example, at least one kind selected from the group consisting of simple substances, alloys and compounds of elements capable of forming an alloy with lithium as an anode active material. Among them, as the anode active material, at least one kind selected from the group consisting of simple substances, alloys and compounds of silicon, germanium and tin is preferably included, and specifically, the simple substance, an alloy or a compound of silicon is preferable, because they have a large ability of inserting and extracting lithium, and depending upon the combination, the energy density of the anode 10 can be increased, compared to conventional graphite. Moreover, it is because the simple substance, an alloy or a compound of silicon is less toxic and inexpensive.

Examples of the alloy or the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq 2$) and $LiSiO$.

Moreover, examples of the compound of germanium include $Ge_3N_4$, $GeO$, $GeO_2$, $GeS$, $GeS_2$, $GeF_4$ and $GeBr_4$. Examples of the compound or the alloy of tin include an alloy of tin and an element in Groups 4 through 11 of the long form of the periodic table of the elements. In addition, $Mg_2Sn$, $SnO_w$ ($0<w\geq 2$), $SnSiO_3$ and $LiSnO$ are cited.

The anode active material layer 12 is preferably formed through at least one method selected from the group consisting of a vapor-phase deposition method, a liquid-phase deposition method and a sintering method. It is because a fracture in the anode active material layer 12 due to expansion and shrinkage thereof according to charge and discharge can be prevented, and the anode current collector 11 and the anode active material layer 12 can be formed as one unit, and the electronic conductivity in the anode active material layer 12 can be improved. Moreover, it is because a binder and voids can be reduced or eliminated, and the anode 10 can be formed into a thin film. In the description, "an active material layer is formed by a sintering method" means that a layer formed through mixing a powder including an active material and a binder is heated in a nonoxidizing atmosphere or the like to form a denser layer with a higher volume density, compared to the layer before heat treatment.

The anode active material layer 12 is preferably alloyed with the anode current collector 11 in at least a part of an interface with the anode current collector 11 so that the anode active material layer 12 can be prevented from falling off the anode current collector 11 due to expansion and shrinkage. More specifically, it is preferable that an element of the anode current collector 11 is diffused into the anode active material layer 12, or an element of the anode active material layer 12 is diffused into the anode current collector 11, or they are diffused into each other. When the anode active material layer 12 is formed by a vapor-phase deposition method, a liquid-phase deposition method or a sintering method, alloying often occurs at the same time; however, alloying may occur by further heat treatment. In the description, the above-described diffusion of the elements is considered as a mode of alloying.

It is preferable that lithium is inserted into the anode active material layer 12 in advance, because even if lithium is consumed by a reaction with an electrolyte or the like in a battery, lithium can be refilled, and an increase in the potential of the anode 10 in late stages of discharge can be prevented. Moreover, it is because when lithium is inserted in advance, a stress on the anode current collector 11 due to expansion and shrinkage according to charge and discharge can be reduced. Further, it is because when the anode active material layer 12 includes at least one kind selected from the group consisting of simple substances, alloys and compounds of silicon, germanium and tin, dangling bonds existing in the anode active material layer 12 or impurities such as hydrogen and oxygen can be reduced.

The amount of lithium inserted into the anode active material layer 12 is preferably within a range from 0.5% to 40% of the anode capacity. When the amount is less than 0.5%, a large effect cannot be obtained, and when the amount is larger than 40%, the capacity declines, and the anode is curved by a stress associated with alloying of the anode active material and lithium, thereby handleability and manufacturability decline.

Moreover, for example, as will be described later, when the anode active material layer 12 is used in a battery, at least in early stages of charge-discharge cycles, electrochemically active lithium preferably remains after discharge. Electrochemically active lithium preferably remains at least after the initial discharge, and more preferably, lithium remains after discharge in the third cycle. In the anode 10, a decline in capacity in as an early stage as approximately the third cycle is pronounced. Electrochemically active lithium may remain after discharge in later cycles.

Whether electrochemically active lithium remains in the anode 10 or not is confirmed as follow. At first, a secondary battery after discharge is disassembled to take out the anode 10, and a half-cell using metal foil on which lithium metal can be precipitated as a counter electrode is formed to check whether extraction of lithium from the anode 10 and precipitation of lithium metal on the counter electrode are possible or not, thereby whether electrochemically active lithium remains or not is confirmed. In other words, it is determined that when extraction of lithium from the anode 10 is observed, electrochemically active lithium remains in the anode 10, and when extraction of lithium from the anode 10 is not observed, electrochemically active lithium does not remain. In this case, any electrolyte solution and any shape of the half-cell can be used as long as the half-cell can be energized, and as the metal foil used as the counter electrode, lithium foil, copper foil, nickel foil or the like is cited. After the anode 10 is taken out from the battery, the anode 10 may be cleaned with an organic solvent with low reactivity with lithium or the like, and dried.

A coating 13 including lithium carbonate is formed on at least a part of a surface of the anode active material layer 12. It is because the amount of lithium oxide, lithium hydroxide or the like formed on the surface of the anode active material layer 12 can be reduced, and, for example, in the case where the coating 13 is used in a battery which will be described later, an increase in impedance in the battery can be prevented. In FIG. 1, the whole surface of the anode active material layer 12 is covered with the coating 13 including lithium carbonate; however, only a part of a surface of the anode active material layer 12 may be covered with the coating 13, or a pore may be included in a part of the coating 13, or the coating 13 may be scattered in the form of islands. Further, the coating 13 may include any other material such as an oxide in addition to lithium carbonate.

Moreover, the coating 13 including lithium carbonate is preferably formed through inserting lithium into the anode active material layer 12, and then bringing the anode active material layer 12 into contact with carbon dioxide. It is because the thickness of the coating 13 including lithium carbonate can be uniform and thinner, and in the case where the coating 13 is used in the battery which will be described later, an increase in impedance in the battery and variations in characteristics can be prevented.

The anode 10 can be manufactured through the following steps, for example.

At first, the anode current collector 11 made of, for example, metal foil is prepared, and the anode active material layer 12 is formed on the anode current collector 11 through depositing an anode active material on the anode current collector 11 by a vapor-phase deposition method or a liquid-phase deposition method. Alternatively, the anode active material layer 12 may be formed by a sintering method in which after a precursor layer including the anode active material in a particle form is formed on the anode current collector 11, the precursor layer is sintered, or the anode active material layer 12 may be formed by a combination of two or three of a vapor deposition method, a liquid-phase deposition method and a sintering method. Thus, through the use of at least one method selected from the group consisting of a vapor-phase deposition method, a liquid-phase deposition method and a sintering method, in some cases, the anode active material layer 12 alloyed with the anode current collector 11 in at least a part of an interface with the anode current collector 11 is formed. In order to further alloy the interface between the anode current collector 11 and the anode active material layer 12, a heat treatment in a vacuum atmosphere or a nonoxidizing atmosphere may be further performed. Specifically, in the case where the anode active material layer 12 is formed through plating, it may be difficult to alloy the interface, so the heat treatment is preferably performed if necessary. Moreover, in the case where the anode active material layer 12 is formed by a vapor-phase deposition method, further alloying the interface between the anode current collector 11 and the anode active material layer 12 may result in improved characteristics, so the heat treatment is preferably performed if necessary.

As the vapor-deposition method, for example, a physical deposition method or a chemical deposition method are used, and more specifically, a vacuum deposition method, a sputtering method, an ion plating method, a laser ablation method, a CVD (Chemical Vapor Deposition) method or the like can be used. As the liquid-phase deposition method, a known method such as an electrolytic plating method or an electroless plating method can be used. As the sintering method, a known technique such as, for example, an atmosphere sintering method, a reaction sintering method or a hot press sintering method can be used.

Next, lithium is inserted into the anode active material layer 12. As a method of inserting lithium, any known technique may be used. For example, lithium metal may be deposited on the surface of the anode active material layer 12 by a vapor-phase deposition method to insert lithium, or lithium may be inserted through attaching lithium metal foil or applying lithium metal in the form of powder. Moreover, an aromatic compound may be used to form a complex with lithium, and the lithium complex and the anode active material layer 12 may come into contact with each other to insert lithium, or lithium may be electrochemically inserted into the anode active material layer 12.

Among them, a method of inserting lithium through depositing lithium metal by a vapor-phase deposition method is preferable. It is because it is highly dangerous to treat highly active lithium metal in the form of powder, and when a solvent is used in the case where lithium is electrochemically inserted, it is more difficult to handle the anode, and applicability to a process of manufacturing a battery is reduced. Moreover, it is because by a vapor-phase deposition method, the amount of lithium to be inserted can be easily controlled at low cost, and lithium can be uniformly inserted in a large area, so an electrode in the form of a roll can be successively treated.

As the vapor-phase deposition method, a vacuum deposition method or an ion plating method in which a material is heated to form a film is preferable; however, a sputtering method may be used. For example, in the case where the anode active material layer 12 is formed by a vapor-phase deposition method, depending upon an apparatus to be used, without opening to the air, lithium metal may be continuously deposited. It is preferable that lithium metal is continuously deposited in such a manner, because redundant water and the formation of an oxide coating can be prevented. In this case, the formation of the anode active material layer 12 and the deposition of lithium metal may be carried out by the same method such as a vacuum deposition method, or they may be carried out by different methods, for example, the formation of the anode active material layer 12 by a sputtering method and the deposition of lithium metal by a vacuum deposition method.

In the case where a vapor-phase deposition method is used, depending upon the amount or the deposition speed of lithium metal, deposited lithium metal is diffused into the anode active material layer 12 in a process of depositing lithium metal, then alloying proceeds to insert lithium. In order to diffuse lithium into the anode active material layer 12 and promote alloying, a heat treatment may be further performed in a nonoxidizing atmosphere.

Next, the coating 13 made of lithium carbonate is formed on at least a part of a surface of the anode active material layer 12. As a method of forming lithium carbonate, for example, the anode active material layer 12 into which lithium metal is inserted is brought into contact with an inactivated gas including carbon dioxide to form the coating 13. For example, when a vacuum deposition method is used as a method of inserting lithium into the anode active material layer 12, an inactivated gas including carbon dioxide may be directly sprayed to the anode active material layer 12 into which lithium is inserted in a vacuum chamber to form the coating 13, or an inactivated gas including carbon dioxide may be substituted in the vacuum chamber to form the coating 13. Moreover, while lithium metal is inserting into the anode active material layer 12, a part of the anode active material layer 12 is successively brought into contact with an inactivated gas including carbon dioxide to form the coating 13. However, in order to prevent an adverse effect on insertion of lithium metal into the anode active material layer 12, a structure in which a chamber for inserting lithium metal and a vacuum chamber are separated is required. These processes are preferable, because after lithium metal is inserted into the anode active material layer 12, it is easy to successively carry out the processes without changing the pressure in the vacuum chamber to a normal pressure. Thereby, the anode 10 shown in FIG. 1 can be obtained.

For example, the anode 10 is used in the following secondary battery.

Figure 2:
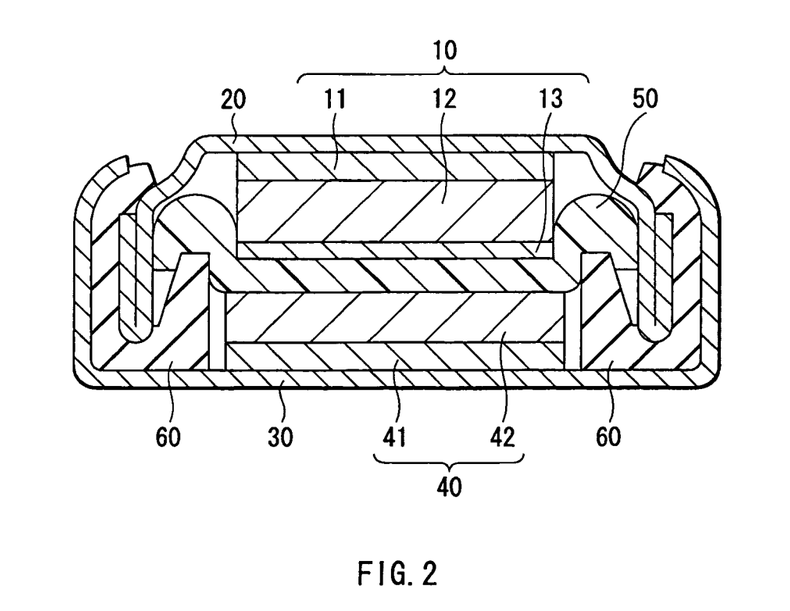
FIG. 2 is a sectional view of a secondary battery using the anode shown in FIG. 1.

FIG. 2 shows the structure of the secondary battery. The secondary battery is a so-called coin type, and an anode 10 contained in a package cup 20 and a cathode 40 contained in a package can 30 are laminated with a separator 50 in between to form the secondary battery. In the secondary battery, in an assembling step, that is, before the initial charge (the initial charge and discharge) the anode 10 has the above-described structure.

Edge portions of the package cup 20 and the package can 30 are caulked with an insulating gasket 60 to seal them. The package cup 20 and the package can 30 are made of, for example, metal such as stainless or aluminum.

The cathode 40 includes, for example, a cathode current collector 41 and a cathode active material layer 42 disposed on the cathode current collector 41, and the cathode active material layer 42 is disposed so as to face the anode active material layer 12. The cathode current collector 41 is made of, for example, aluminum, nickel or stainless.

The cathode active material layer 42 includes, for example, one kind or two or more kinds of cathode materials capable of inserting and extracting lithium as the cathode active material, and may include an electronic conductor such as a carbon material and a binder such as polyvinylidene fluoride if necessary. As the cathode material capable of inserting and extracting lithium, for example, a lithium-containing metal complex oxide represented by a general formula $Li_xMIO_2$ is preferable, because the lithium-containing metal complex oxide can generate a high voltage, and has a high density, so the capacity of the secondary battery can be further increased. In the formula, MI represents one or more kinds of transition metals, and, for example, at least one kind selected from the group consisting of cobalt and nickel is preferable as MI. The value of x depends upon a charge-discharge state of the battery, and is generally within a range of $0.05 \leq x \leq 1.10$. Specific examples of such a lithium-containing metal complex oxide include $LiCoO_2$, $LiNiO_2$ and the like.

The cathode 40 can be formed through the following steps, for example. The cathode active material, an electronic conductor and a binder are mixed to form a mixture, and the mixture is dispersed in a dispersion medium such as N-methylpyrolidone to form mixture slurry. Then, after the mixture slurry is applied to the cathode current collector 41 made of metal foil, and dried, the mixture slurry is compression molded to form the cathode active material layer 42, thereby the cathode 40 is formed.

The separator 50 is provided to isolate the anode 10 from the cathode 40 to prevent a short circuit of current due to contact between the anode 10 and the cathode 40, and passes lithium ions therethrough. The separator 50 is made of, for example, polyethylene or polypropylene.

The separator 50 is impregnated with an electrolyte solution which is a liquid electrolyte. The electrolyte solution includes, for example, a solvent and a lithium salt as an electrolyte salt dissolved in the solvent, and may include various additives if necessary. Examples of the solvent include organic solvents such as ethylene carbonate, propylene carbonate, dimethyl carbonate, diethyl carbonate and ethyl methyl carbonate. One kind or a mixture of two or more kinds selected from them may be used.

Examples of the lithium salt include $LiPF_6$, $LiCF_3SO_3$ and $LiClO_4$. One kind or a mixture of two or more kinds of lithium salts may be used.

The secondary battery can be manufactured through laminating the anode 10, the separator 50 which is impregnated with the electrolyte solution and the cathode 40, containing them in the package cup 20 and the package can 30, and caulking the package cup 20 and the package can 30.

When the secondary battery is charged, for example, lithium ions are extracted from the cathode 40, and are inserted into the anode 10 through the electrolyte solution. When the secondary battery is discharged, for example, lithium ions are extracted from the anode 10, and are inserted into the cathode 40 through the electrolyte solution. At this time, the coating 13 including lithium carbonate is formed on at least a part of a surface of the anode active material layer 12 in the anode 10, so an increase in impedance in the battery and variations in impedance due to the thickness of the coating 13 can be prevented. Moreover, lithium is inserted into the anode 10 in advance, so in early stages of cycles, the consumption of lithium due to a reaction with the electrolyte solution can be prevented, and even if lithium is consumed, lithium can be refilled, so degradation in early stages can be prevented. Moreover, at least in early stages of charge-discharge cycles, electrochemically active lithium remains after discharge, so an increase in the potential of the anode in the late stages of discharge can be prevented, thereby degradation according to an increase in the potential of the anode can be prevented. Therefore, superior charge-discharge cycle characteristics can be obtained.

The anode 10 according to the embodiment may be used in the following secondary battery.

Figure 3:
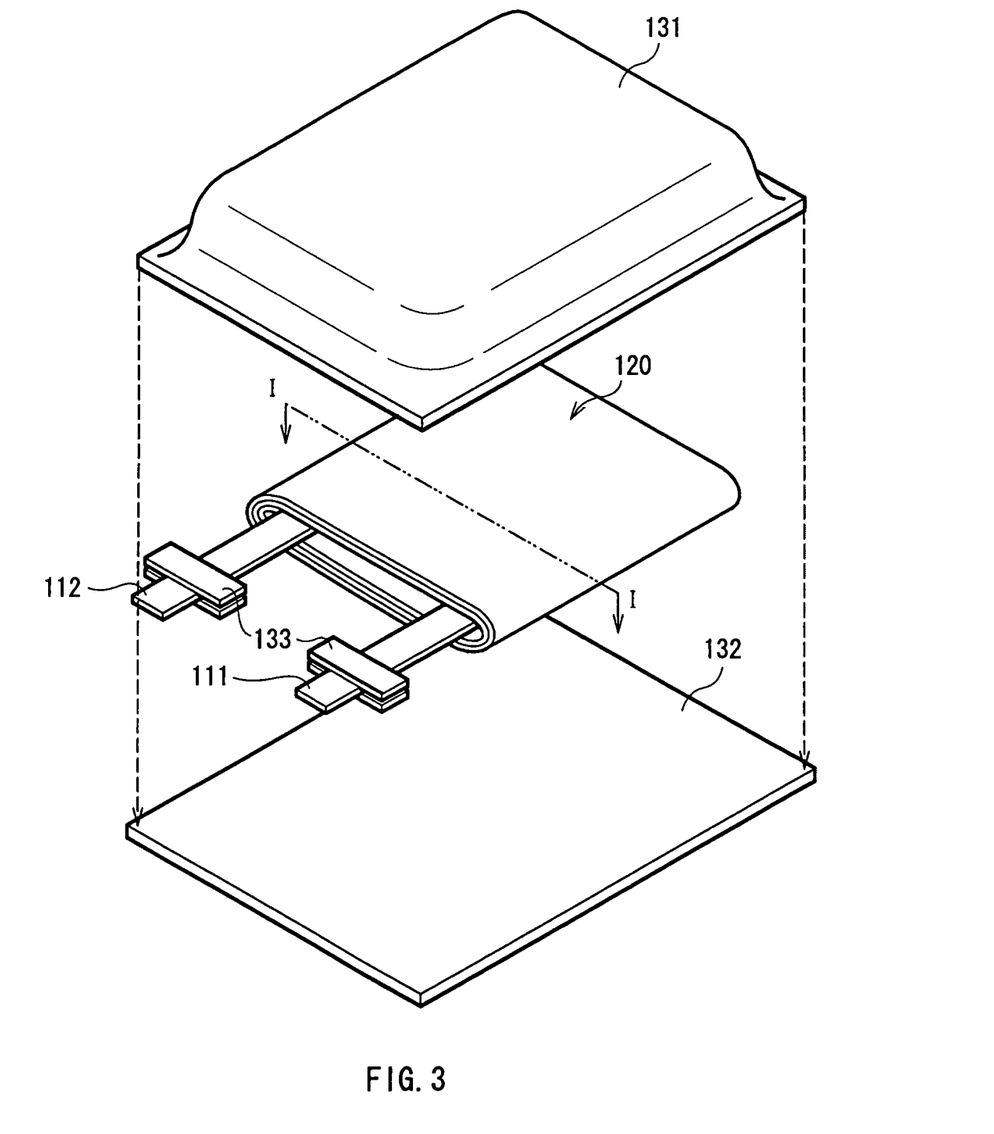
FIG. 3 is a perspective exploded view of another secondary battery using the anode shown in FIG. 1.

FIG. 3 shows the structure of the secondary battery. The secondary battery comprises a spirally wound electrode body 120 to which leads 111 and 112 are attached and which is contained in film-shaped package members 131 and 132, thereby the secondary battery can be formed with a smaller size, a lighter weight and a lower profile.

The leads 111 and 112 are drawn from the interiors of the package members 131 and 132 to outside in the same direction. The leads 111 and 112 are made of, for example, a metal material such as aluminum, copper, nickel or stainless in a sheet shape or a mesh shape.

The package members 131 and 132 are made of, for example, a rectangular aluminum laminate film including a nylon film, aluminum foil and a polyethylene film laminated in this order. The package members 131 and 132 are disposed so that the polyethylene film of each of the package members 131 and 132 faces the spirally wound electrode body 120, and edge portions of the package members 131 and 132 are adhered to each other by fusion bonding or an adhesive. An adhesive film 133 is inserted each between the package member 131 and the lead 111, between the package member 131 and the lead 112, between the package member 132 and the lead 111 and between the package member 132 and the lead 112 for preventing the entry of outside air. The adhesive film 133 is made of, for example, a material having adhesion to the leads 111 and 112, that is, a polyolefin resin such as polyethylene, polypropylene, modified polyethylene or modified polypropylene.

In addition, the package members 131 and 132 may be made of a laminate film with any other structure, a high molecular weight film such as polypropylene or a metal film instead of the aluminum laminate film.

Figure 4:
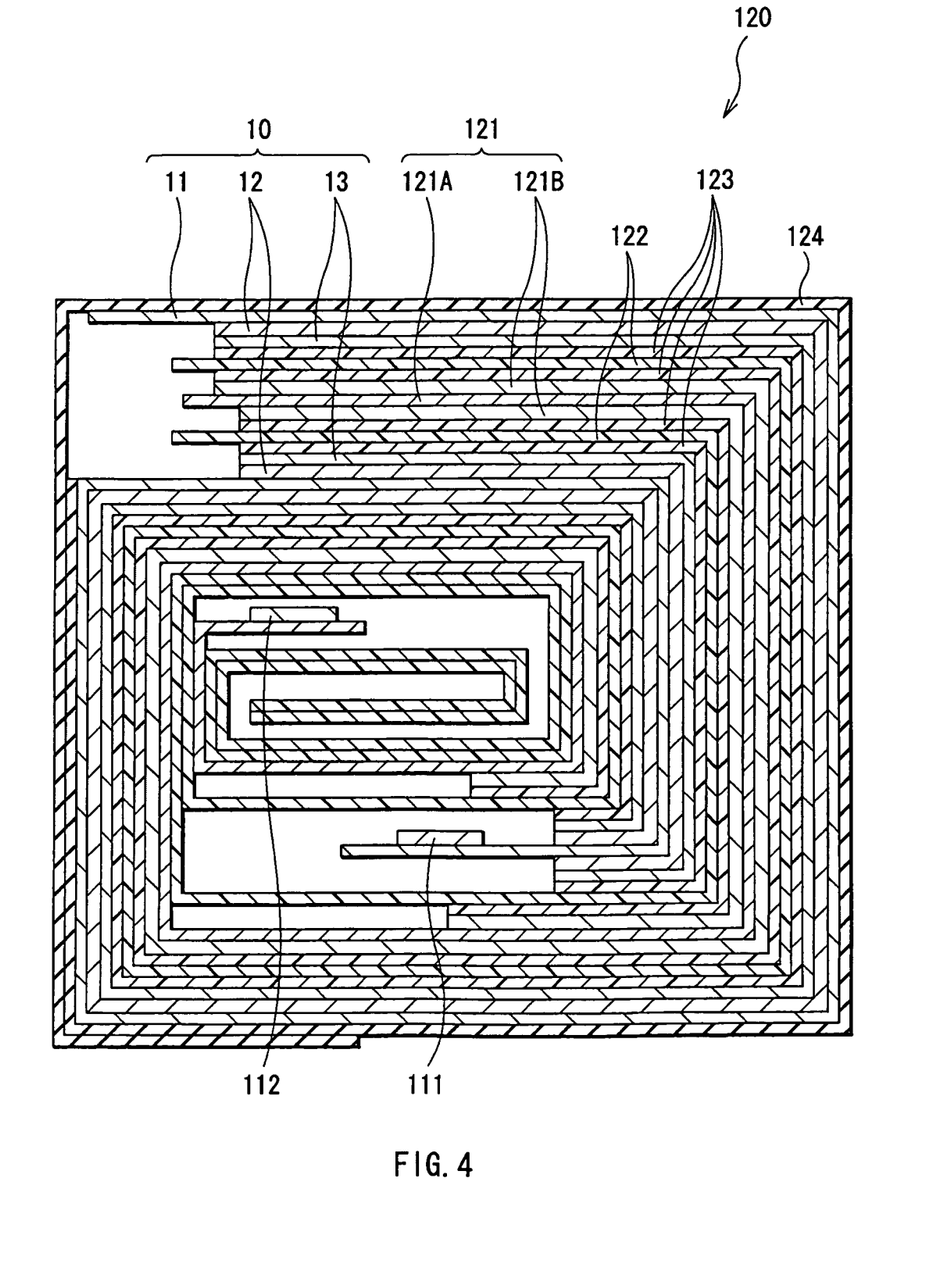
FIG. 4 is a sectional view of a spirally wound electrode body taken along a line I-I of FIG. 3.

FIG. 4 shows a sectional view of the spirally wound electrode body 120 taken along a line I-I of FIG. 3. The spirally wound electrode body 120 is a spirally wound laminate including the anode 10 and a cathode 121 with a separator 122 and an electrolyte layer 123 in between, and an outermost portion of the spirally wound electrode body 120 is protected with a protective tape 124.

The anode 10 has a structure in which the anode active material layer 12 is disposed on one side or both sides of the anode current collector 11, and lithium ranging from 0.5% to 40% of the anode capacity is inserted into the anode 10 in advance before the initial charge (before the initial charge and discharge). The cathode 121 has a structure in which a cathode active material layer 121B is disposed on one side or both sides of a cathode current collector 121B, and the cathode active material layer 121B is disposed so as to face the anode active material layer 12. The structures of the cathode current collector 121A, the cathode active material layer 121B and the separator 122 are the same as those of the cathode current collector 41, the cathode active material layer 42 and the separator 50, respectively.

The electrolyte layer 123 is made of a so-called gel electrolyte in which a holding body holds an electrolyte solution. The gel electrolyte is preferable, because the gel electrolyte can obtain high ion conductivity, and can prevent leakage of the battery or expansion due to high temperature. The structure of the electrolyte solution (that is, a solvent and an electrolyte salt) is the same as that in the coin type secondary battery shown in FIG. 2. The holding body is made of, for example, a polymeric material. As the polymeric material, for example, polyvinylidene fluoride is cited.

The secondary battery can be manufactured through the following steps, for example.

At first, an electrolyte layer 123 in which a holding body holds an electrolyte solution is formed on each of the anode 10 and the cathode 121. After that, the lead 111 is attached to an end portion of the anode current collector 11 through welding, and the lead 112 is attached to an end portion of the cathode current collector 121A through welding. Next, after the anode 10 on which the electrolyte layer 123 is formed and the cathode 121 on which the electrolyte layer 123 is formed are laminated with the separator 122 in between to form a laminate body, the laminate body was spirally wound in a longitudinal direction, and the protective tape 124 is bonded to an outermost portion of the laminate body so as to form the spirally wound electrode body 120. Finally, for example, the spirally wound electrode body 120 is sandwiched between the package members 131 and 132, and edge portions of the package members 131 and 132 are adhered to each other through thermal fusion bonding or the like to seal the spirally wound electrode body 120 in the package members 131 and 132. At this time, the adhesive film 133 is inserted each between the lead 111 and the package member 131, between the lead 111 and the package member 132, between the lead 112 and the package member 131 and between the lead 112 and the package member 132. Thereby, the secondary battery shown in FIGS. 3 and 4 is completed.

The functions of the secondary battery are equivalent to the coin type secondary battery shown in FIG. 2.

Thus, in the embodiment, the anode 10 comprises the coating 13 including lithium carbonate on at least a part of a surface of the anode active material layer 12, so the amount of lithium oxide, lithium hydroxide or the like formed on the surface of the anode active material layer 12 can be reduced, and when the anode 10 is applied to the battery according to the embodiment, an increase in impedance in the battery can be prevented. Moreover, the anode is less subject to an influence by a difference in a handling environment or storage conditions, so variations in impedance can be prevented.

Specifically, when lithium is inserted into the anode active material layer 12, in the early stages of the cycles, the consumption of lithium due to a reaction with the electrolyte solution or the like can be prevented, and even if the lithium is consumed, lithium can be refilled, so degradation in the early stages can be prevented. Moreover, a stress on the anode current collector 11 due to expansion and shrinkage of the anode active material layer 12 according to charge and discharge can be reduced. Further, when electrochemically active lithium remains in the anode 10 after discharge, an increase in the potential of the anode in the late stages of discharge can be prevented, and degradation according to an increase in the potential of the anode 10 can be prevented. Therefore, battery characteristics such as cycle characteristics can be improved.

Moreover, when lithium metal is deposited by a vapor-phase deposition method to insert lithium, in a process of depositing lithium metal, lithium can be inserted, so handling can be easier. Further, the amount of lithium to be inserted can be easily controlled, and lithium can be uniformly inserted in a large area. Moreover, in the case where the anode active material layer 12 is formed by a vapor-phase deposition method, a step of forming the anode active material layer 12 and a step of inserting lithium can be successively carried out, so manufacturing steps can be simplified.

In addition, when the coating 13 including lithium carbonate is formed through inserting lithium into the anode active material layer 12, and then bringing the anode active material layer into contact with carbon dioxide, lithium is diffused over the anode active material layer 12, and alloyed with the anode active material layer 12, so compared to lithium metal, the surface of the anode active material layer 12 is less active, and the thickness and variations of the coating 13 can be reduced. Therefore, an increase in impedance in the battery and variations in characteristics can be prevented.

Moreover, when the anode active material layer 12 includes at least one kind selected from the group consisting of simple substances, alloys and compounds of silicon, germanium and tin, a higher capacity can be obtained, and a loss in the capacity due to insertion of lithium in advance can be reduced. Further, when lithium is inserted, dangling bonds existing in the anode active material layer 12 or impurities such as hydrogen and oxygen can be reduced, so battery characteristics such as cycle characteristics can be improved.

EXAMPLES

Examples of the invention will be described in detail below referring to FIGS. 1 through 4. In the following examples, like components are donated by like numerals as of the above embodiment.

Examples 1-1 through 1-5

Secondary batteries shown in FIGS. 3 and 4 were formed. At first, the anode active material layer 12 made of silicon was formed on the anode current collector 11 made of copper foil with a thickness of 15 μm by a sputtering method. Next, lithium metal was deposited on the anode active material layer 12 by a vacuum deposition method. An atmosphere at the time of depositing lithium metal was less than $1 \times 10^{-3}$ Pa, and the deposition speed was 5 nm/s to 10 nm/s. The amount of deposited lithium metal, that is, the amount of lithium inserted into the anode active material layer 12 in advance was 5% of the anode capacity.

After lithium metal was deposited, an inactivated gas which included a mixture of carbon dioxide and argon at a volume ratio of 20:80 was introduced into a vacuum chamber at a flow rate of 50 cm$^3$/min (1 atm, 25° C.), and then a process of inactivating the anode active material layer 12 was carried out. After that, an argon gas was introduced into the vacuum chamber to change the pressure in the vacuum chamber to an atmospheric pressure, and the anode 10 was taken out from the vacuum chamber. At that stage, the coating 13 including lithium carbonate was formed on the surface of the anode 10, and lithium metal was alloyed with the anode active material layer 12 so that lithium metal was inserted into the anode active material layer 12, so lithium metal did not exist. The anode 10 obtained through the above steps was cut into 5 anodes 10 with a predetermined size. Thereby, the anodes 10 of Examples 1-1 through 1-5 from the same lot were obtained.

Next, lithium cobalt oxide ($LiCoO_2$) powder with an average diameter of 5 μm as a cathode active material, carbon black as an electronic conductor and polyvinylidene fluoride as a binder were mixed at a mass ratio of 92:3:5, and the mixture was put into N-methyl pyrrolidone as a dispersion medium to form mixture slurry. After the mixture slurry was applied to the cathode current collector 121A made of aluminum with a thickness of 15 μm, and was dried, the slurry was pressed to form the cathode active material layer 121B, thereby the cathode 121 was formed.

After the anode 10 and the cathode 121 were formed, a precursor solution in which 10 wt % of polyvinylidene fluoride as a block copolymer with a weight-average molecular weight of 600,000 and 60 wt % of dimethyl carbonate as a mixed solvent were mixed with and dissolved in 30 wt % of an electrolyte solution including 42.5 wt % of ethylene carbonate, 42.5 wt % of propylene carbonate and 15 wt % of $LiPF_6$ as a lithium salt was applied to the anode 10 and the cathode 121, and the anode 10 and the cathode 121 was left at room temperature for 8 hours to volatilize dimethyl carbonate, thereby the electrolyte layer 123 was formed.

After the electrolyte layer 123 was formed, the anode 10 on which the electrolyte layer 123 was formed and the cathode 121 on which the electrolyte layer 123 was formed were laminated with the separator 122 in between to form a laminate body, and then the laminate body was spirally wound in a longitudinal direction, and the protective tape 124 was bonded to an outermost portion of the laminate body so as to form the spirally wound electrode body 120. As the separator 122, a film made of polypropylene was used. After that, the spirally wound electrode body 120 was sandwiched between the package members 131 and 132 made of an aluminum laminate film, and the spirally wound electrode body 120 was sealed in the package members 131 and 132. Thereby, the batteries of Examples 1-1 through 1-5 were obtained.

A charge-discharge test was carried out on the secondary batteries of Examples 1-1 through 1-5 at 25° C. to determine their capacity retention ratios in the 50th cycle. At that time, the secondary batteries were charged at a constant current density of 1 $mA/cm^2$ until a battery voltage reached 4.2 V, then charge was continued at a constant voltage of 4.2 V until a current density reached 0.02 $mA/cm^2$. The secondary batteries were discharged at a constant current density of 1 $mA/cm^2$ until the battery voltage reached 2.5 V. When the batteries were charged, the utilization ratio of the capacity of the anode 10 from which the amount of lithium inserted in advance was subtracted was 90% in the initial cycle, and the deposition of lithium metal on the anode 10 was prevented. The capacity retention ratio in the 50th cycle was determined as a ratio of a discharge capacity in the 50th cycle to the initial discharge capacity, that is, (the discharge capacity in the 50th cycle/the discharge capacity in the first cycle)%100. The obtained results are shown in Table 1. Moreover, the degree of variations in cycle characteristics of the secondary batteries of Examples 1-1 through 1-5 was measured by the standard deviation of the capacity retention ratio. The obtained results are shown in Table 1.

Moreover, after discharge in the third cycle, the secondary batteries of Examples 1-1 through 1-5 were disassembled to take out the anode 10, and the anode 10 was cleaned with dimethyl carbonate, then a coin type half-cell using the anode 10 as a working electrode was formed. At that time, as an electrolyte, an electrolyte solution formed through dissolving $LiPF_6$ as a lithium salt in a mixed solvent including ethylene carbonate and dimethyl carbonate at a mass ratio of 1:1 was used, as a separator, a film made of polypropylene was used, and as a counter electrode, lithium metal foil was used.

After the formed half-cell was electrolyzed at a constant current density of 0.06 $mA/cm^2$ until a potential difference between the electrodes reached 1.4 V, the half-cell was electrolyzed at a constant voltage of 1.4 V until the current density reached 0.02 $mA/cm^2$. Thereby, the quantity of electricity corresponding to extraction of lithium from the working electrode was observed. In other words, it was confirmed that electrochemically active lithium remained in the anode 10 after discharge in the secondary batteries of Examples 1-1 through 1-5. In Table 1, "present" was shown in the column "REMAINING Li".

As Comparative Examples 1-1 through 1-5 relative to Examples 1-1 through 1-5, secondary batteries were formed as in the case of Examples 1-1 through 1-5, except that an inactivation process by an inactivated gas was not carried out. A charge-discharge test was carried out on the secondary batteries of Comparative Examples 1-1 through 1-5 as in the case of Examples 1-1 through 1-5 to determine their capacity retention ratios in the 50th cycle. The results are shown in Table 1. Moreover, as in the case of Examples 1-1 through 1-5, after discharge in the third cycle, the anode was taken out to form a half-cell, thereby it was confirmed that electrochemically active lithium remained after discharge. Further, as in the case of Examples 1-1 through 1-5, the degree of variations in cycle characteristics of the secondary batteries of Comparative Examples 1-1 through 1-5 were measured by the standard deviation.

TABLE 1

| | ANODE ACTIVE MATERIAL | LITHIUM CARBONATE COATING | AMOUNT OF INSERTED Li (%) | REMAINING Li | CAPACITY RETENTION RATIO (%) | STANDARD DEVIATION |
|---|---|---|---|---|---|---|
| EXAMPLE 1-1 | Si | PRESENT | 5 | PRESENT | 95.2 | 0.152 |
| EXAMPLE 1-2 | | | | | 95.1 | |
| EXAMPLE 1-3 | | | | | 95.1 | |
| EXAMPLE 1-4 | | | | | 95.1 | |
| EXAMPLE 1-5 | | | | | 94.8 | |
| COMPARATIVE EXAMPLE 1-1 | Si | ABSENT | 5 | PRESENT | 94.5 | 0.442 |
| COMPARATIVE EXAMPLE 1-2 | | | | | 93.8 | |
| COMPARATIVE EXAMPLE 1-3 | | | | | 93.8 | |
| COMPARATIVE EXAMPLE 1-4 | | | | | 93.6 | |
| COMPARATIVE EXAMPLE 1-5 | | | | | 93.3 | |

It was obvious from Table 1 that in Examples 1-1 through 1-5 in which an inactivation process by an inactivated gas including carbon dioxide was carried out on the anode 10, compared to Comparative Examples 1-1 through 1-5 in which no inactivation process was carried out, a higher capacity retention ratio was obtained, and the degree of the variations was smaller. In other words, it was found out that when a coating including lithium carbonate was formed through carrying out an inactivation process by an inactivated gas including carbon dioxide on the anode 10, the cycle characteristics could be improved, and the degree of the variations could be reduced.

Examples 2-1 through 2-5, 3-1 through 3-5, 4-1 through 4-5

Secondary batteries of Examples 2-1 through 2-5, 3-1 through 3-5 and 4-1 through 4-5 were formed as in the case of Examples 1-1 through 1-5, except that the amount of lithium inserted into the anode active material layer 12 in advance was changed to 10%, 20% and 30%. Moreover, as Comparative Examples 2-1 through 2-5, 3-1 through 3-5 and 4-1 through 4-5, secondary batteries were formed as in the case of Examples 2-1 through 2-5, 3-1 through 3-5 and 4-1 through 4-5, except that no inactivation process by an inactivated gas was carried out. A charge-discharge test was carried out on the secondary batteries of Examples 2-1 through 2-5, 3-1 through 3-5 and 4-1 through 4-5 and Comparative Examples 2-1 through 2-5, 3-1 through 3-5 and 4-1 through 4-5 as in the case of Examples 1-1 through 1-5 to determine their capacity retention ratio in the 50th cycle and measure the degree of the variations by the standard deviation. The obtained results are shown in Tables 2 through 4.

TABLE 2

| | ANODE ACTIVE MATERIAL | LITHIUM CARBONATE COATING | AMOUNT OF INSERTED Li (%) | REMAINING Li | CAPACITY RETENTION RATIO (%) | STANDARD DEVIATION |
|---|---|---|---|---|---|---|
| EXAMPLE 2-1 | Si | PRESENT | 10 | PRESENT | 97.4 | 0.187 |
| EXAMPLE 2-2 | | | | | 97.3 | |
| EXAMPLE 2-3 | | | | | 97.2 | |
| EXAMPLE 2-4 | | | | | 97.2 | |
| EXAMPLE 2-5 | | | | | 96.9 | |
| COMPARATIVE EXAMPLE 2-1 | Si | ABSENT | 10 | PRESENT | 96.7 | 1.390 |
| COMPARATIVE EXAMPLE 2-2 | | | | | 96.2 | |
| COMPARATIVE EXAMPLE 2-3 | | | | | 94.4 | |
| COMPARATIVE EXAMPLE 2-4 | | | | | 94.3 | |
| COMPARATIVE EXAMPLE 2-5 | | | | | 93.4 | |

TABLE 3

| | ANODE ACTIVE MATERIAL | LITHIUM CARBONATE COATING | AMOUNT OF INSERTED Li (%) | REMAINING Li | CAPACITY RETENTION RATIO (%) | STANDARD DEVIATION |
|---|---|---|---|---|---|---|
| EXAMPLE 3-1 | Si | PRESENT | 20 | PRESENT | 97.9 | 0.311 |
| EXAMPLE 3-2 | | | | | 97.9 | |
| EXAMPLE 3-3 | | | | | 97.7 | |
| EXAMPLE 3-4 | | | | | 97.4 | |
| EXAMPLE 3-5 | | | | | 97.2 | |
| COMPARATIVE EXAMPLE 3-1 | Si | ABSENT | 20 | PRESENT | 96.6 | 1.503 |
| COMPARATIVE EXAMPLE 3-2 | | | | | 95.3 | |
| COMPARATIVE EXAMPLE 3-3 | | | | | 95.0 | |
| COMPARATIVE EXAMPLE 3-4 | | | | | 94.3 | |
| COMPARATIVE EXAMPLE 3-5 | | | | | 92.5 | |

TABLE 4

| | ANODE ACTIVE MATERIAL | LITHIUM CARBONATE COATING | AMOUNT OF INSERTED Li (%) | REMAINING Li | CAPACITY RETENTION RATIO (%) | STANDARD DEVIATION |
|---|---|---|---|---|---|---|
| EXAMPLE 4-1 | Si | PRESENT | 30 | PRESENT | 96.3 | 0.402 |
| EXAMPLE 4-2 | | | | | 95.9 | |
| EXAMPLE 4-3 | | | | | 95.7 | |
| EXAMPLE 4-4 | | | | | 95.4 | |
| EXAMPLE 4-5 | | | | | 95.3 | |
| COMPARATIVE EXAMPLE 4-1 | Si | ABSENT | 30 | PRESENT | 95.8 | 1.842 |
| COMPARATIVE EXAMPLE 4-2 | | | | | 94.3 | |
| COMPARATIVE EXAMPLE 4-3 | | | | | 94.0 | |
| COMPARATIVE EXAMPLE 4-4 | | | | | 91.9 | |
| COMPARATIVE EXAMPLE 4-5 | | | | | 91.3 | |

It was obvious from Tables 2 through 4 that in Examples 2-1 through 2-5, 3-1 through 3-5 and 4-1 through 4-5, the same results as those in Examples 1-1 through 1-5 were obtained.

Moreover, it was obvious from a comparison between Tables 1 through 4 that the smaller the amount of lithium inserted into the anode 10 in advance was, the smaller variations in capacity were. In other words, it was found out that the smaller the amount of lithium inserted into the anode 10 was, the lower the activity was, so the thickness of the coating 13 including lithium carbonate formed by an inactivation process was uniform, and the variations in the capacity retention ratio could be reduced.

Examples 5-1 through 5-5, 6-1 through 6-5, 7-1 through 7-5, 8-1 through 8-5

Secondary batteries were formed as in the case of Examples 1-1 through 1-5, 2-1 through 2-5, 3-1 through 3-5 and 4-1 through 4-5, except that the anode active material layer 12 was formed of germanium by a sputtering method. As Comparative Examples 5-1 through 5-5, 6-1 through 6-5, 7-1 through 7-5 and 8-1 through 8-5 relative to the examples, secondary batteries were formed as in the case of Examples 5-1 through 5-5, 6-1 through 6-5, 7-1 through 7-5 and 8-1 through 8-5, except that no inactivation process by an inactivated gas was carried out. A charge-discharge test was carried out on the secondary batteries of Examples 5-1 through 5-5, 6-1 through 6-5, 7-1 through 7-5 and 8-1 through 8-5 and Comparative Examples 5-1 through 5-5, 6-1 through 6-5, 7-1 through 7-5 and 8-1 through 8-5 as in the case of Examples 1-1 through 1-5 to determine their capacity retention ratios in the 50th cycles and measure the degree of the variations by the standard deviation. The obtained results are shown in Tables 5 through 8.

TABLE 5

| | ANODE ACTIVE MATERIAL | LITHIUM CARBONATE COATING | AMOUNT OF INSERTED Li (%) | REMAINING Li | CAPACITY RETENTION RATIO (%) | STANDARD DEVIATION |
|---|---|---|---|---|---|---|
| EXAMPLE 5-1 | Ge | PRESENT | 5 | PRESENT | 90.4 | 0.217 |
| EXAMPLE 5-2 | | | | | 90.2 | |
| EXAMPLE 5-3 | | | | | 90.0 | |
| EXAMPLE 5-4 | | | | | 89.9 | |
| EXAMPLE 5-5 | | | | | 89.9 | |
| COMPARATIVE EXAMPLE 5-1 | Ge | ABSENT | 5 | PRESENT | 89.6 | 0.661 |
| COMPARATIVE EXAMPLE 5-2 | | | | | 88.9 | |
| COMPARATIVE EXAMPLE 5-3 | | | | | 88.7 | |
| COMPARATIVE EXAMPLE 5-4 | | | | | 88.4 | |
| COMPARATIVE EXAMPLE 5-5 | | | | | 87.8 | |

TABLE 6

| | ANODE ACTIVE MATERIAL | LITHIUM CARBONATE COATING | AMOUNT OF INSERTED Li (%) | REMAINING Li | CAPACITY RETENTION RATIO (%) | STANDARD DEVIATION |
|---|---|---|---|---|---|---|
| EXAMPLE 6-1 | Ge | PRESENT | 10 | PRESENT | 92.3 | 0.261 |
| EXAMPLE 6-2 | | | | | 92.3 | |
| EXAMPLE 6-3 | | | | | 92.1 | |
| EXAMPLE 6-4 | | | | | 91.9 | |
| EXAMPLE 6-5 | | | | | 91.7 | |
| COMPARATIVE EXAMPLE 6-1 | Ge | ABSENT | 10 | PRESENT | 91.8 | 1.458 |
| COMPARATIVE EXAMPLE 6-2 | | | | | 91.5 | |
| COMPARATIVE EXAMPLE 6-3 | | | | | 90.1 | |
| COMPARATIVE EXAMPLE 6-4 | | | | | 88.9 | |
| COMPARATIVE EXAMPLE 6-5 | | | | | 88.6 | |

TABLE 7

| | ANODE ACTIVE MATERIAL | LITHIUM CARBONATE COATING | AMOUNT OF INSERTED Li (%) | REMAINING Li | CAPACITY RETENTION RATIO (%) | STANDARD DEVIATION |
|---|---|---|---|---|---|---|
| EXAMPLE 7-1 | Ge | PRESENT | 20 | PRESENT | 91.8 | 0.259 |
| EXAMPLE 7-2 | | | | | 91.5 | |
| EXAMPLE 7-3 | | | | | 91.4 | |
| EXAMPLE 7-4 | | | | | 91.3 | |
| EXAMPLE 7-5 | | | | | 91.1 | |
| COMPARATIVE EXAMPLE 7-1 | Ge | ABSENT | 20 | PRESENT | 90.5 | 1.587 |
| COMPARATIVE EXAMPLE 7-2 | | | | | 90.1 | |
| COMPARATIVE EXAMPLE 7-3 | | | | | 89.9 | |
| COMPARATIVE EXAMPLE 7-4 | | | | | 87.4 | |
| COMPARATIVE EXAMPLE 7-5 | | | | | 87.2 | |

TABLE 8

| | ANODE ACTIVE MATERIAL | LITHIUM CARBONATE COATING | AMOUNT OF INSERTED Li (%) | REMAINING Li | CAPACITY RETENTION RATIO (%) | STANDARD DEVIATION |
|---|---|---|---|---|---|---|
| EXAMPLE 8-1 | Ge | PRESENT | 30 | PRESENT | 94.4 | 0.418 |
| EXAMPLE 8-2 | | | | | 94.0 | |
| EXAMPLE 8-3 | | | | | 93.7 | |
| EXAMPLE 8-4 | | | | | 93.6 | |
| EXAMPLE 8-5 | | | | | 93.3 | |
| COMPARATIVE EXAMPLE 8-1 | Ge | ABSENT | 30 | PRESENT | 93.2 | 1.632 |
| COMPARATIVE EXAMPLE 8-2 | | | | | 93.0 | |
| COMPARATIVE EXAMPLE 8-3 | | | | | 91.9 | |
| COMPARATIVE EXAMPLE 8-4 | | | | | 90.5 | |
| COMPARATIVE EXAMPLE 8-5 | | | | | 89.4 | |

It was obvious from Tables 5 through 8 that in Examples 5-1 through 5-5, 6-1 through 6-5, 7-1 through 7-5 and 8-1 through 8-5, as in the case of Examples 1-1 through 1-5, a higher capacity retention ratio was obtained, and the degree of the variations was smaller, compared to Comparative Examples 5-1 through 5-5, 6-1 through 6-5, 7-1 through 7-5 and 8-1 through 8-5 in which no inactivation process was carried out. Moreover, the smaller the amount of lithium inserted into the anode 10 in advance was, the smaller the variations in the capacity retention ratio were. In other words, it was found out that in the case where germanium was used as the anode active material, the same effects as in the case where silicon was used could be obtained.

Examples 9-1 through 9-5, 10-1 through 10-5, 1-1 through 11-5, 12-1 through 12-5

Secondary batteries were formed as in the case of Examples 1-1 through 1-5, 2-1 through 2-5, 3-1 through 3-5 and 4-1 through 4-5, except that the anode active material layer 12 made of tin with a thickness of 5 μm was formed on the anode current collector 11 made of copper foil with a thickness of 15 μm by a vacuum deposition method, and then a heat treatment was performed in an inert atmosphere at 200° C. for 12 hours. As Comparative Examples 9-1 through 9-5, 10-1 through 10-5, 11-1 through 11-5 and 12-1 through 12-5 relative to the examples, secondary batteries were formed as in the case of Examples 9-1 through 9-5, 10-1 through 10-5, 11-1 through 11-5 and 12-1 through 12-5, except that no inactivation process by an inactivated gas was carried out. A charge-discharge test was carried out on the secondary batteries of Examples 9-1 through 9-5, 10-1 through 10-5, 11-1 through 11-5 and 12-1 through 12-5 and Comparative Examples 9-1 through 9-5, 10-1 through 10-5, 11-1 through 11-5 and 12-1 through 12-5 as in the case of Examples 1-1 through 1-5 to determine their capacity retention ratios in the 50th cycles and measure the degree of the variations by the standard deviation. The obtained results are shown in Tables 9 through 12.

TABLE 9

|  | ANODE ACTIVE MATERIAL | LITHIUM CARBONATE COATING | AMOUNT OF INSERTED Li (%) | REMAINING Li | CAPACITY RETENTION RATIO (%) | STANDARD DEVIATION |
| --- | --- | --- | --- | --- | --- | --- |
| EXAMPLE 9-1 | Sn | PRESENT | 5 | PRESENT | 55.5 | 0.130 |
| EXAMPLE 9-2 |  |  |  |  | 55.3 |  |
| EXAMPLE 9-3 |  |  |  |  | 55.2 |  |
| EXAMPLE 9-4 |  |  |  |  | 55.2 |  |
| EXAMPLE 9-5 |  |  |  |  | 55.2 |  |
| COMPARATIVE EXAMPLE 9-1 | Sn | ABSENT | 5 | PRESENT | 55.5 | 0.402 |
| COMPARATIVE EXAMPLE 9-2 |  |  |  |  | 55.1 |  |
| COMPARATIVE EXAMPLE 9-3 |  |  |  |  | 54.9 |  |
| COMPARATIVE EXAMPLE 9-4 |  |  |  |  | 54.6 |  |
| COMPARATIVE EXAMPLE 9-5 |  |  |  |  | 54.5 |  |

TABLE 10

|  | ANODE ACTIVE MATERIAL | LITHIUM CARBONATE COATING | AMOUNT OF INSERTED Li (%) | REMAINING Li | CAPACITY RETENTION RATIO (%) | STANDARD DEVIATION |
| --- | --- | --- | --- | --- | --- | --- |
| EXAMPLE 10-1 | Sn | PRESENT | 10 | PRESENT | 59.3 | 0.182 |
| EXAMPLE 10-2 |  |  |  |  | 59.1 |  |
| EXAMPLE 10-3 |  |  |  |  | 59.1 |  |
| EXAMPLE 10-4 |  |  |  |  | 59.0 |  |
| EXAMPLE 10-5 |  |  |  |  | 58.8 |  |
| COMPARATIVE EXAMPLE 10-1 | Sn | ABSENT | 10 | PRESENT | 59.4 | 1.779 |
| COMPARATIVE EXAMPLE 10-2 |  |  |  |  | 59.0 |  |
| COMPARATIVE EXAMPLE 10-3 |  |  |  |  | 56.9 |  |
| COMPARATIVE EXAMPLE 10-4 |  |  |  |  | 55.8 |  |
| COMPARATIVE EXAMPLE 10-5 |  |  |  |  | 55.5 |  |

TABLE 11

| | ANODE ACTIVE MATERIAL | LITHIUM CARBONATE COATING | AMOUNT OF INSERTED Li (%) | REMAINING Li | CAPACITY RETENTION RATIO (%) | STANDARD DEVIATION |
|---|---|---|---|---|---|---|
| EXAMPLE 11-1 | Sn | PRESENT | 20 | PRESENT | 69.4 | 0.363 |
| EXAMPLE 11-2 | | | | | 69.4 | |
| EXAMPLE 11-3 | | | | | 69.2 | |
| EXAMPLE 11-4 | | | | | 68.8 | |
| EXAMPLE 11-5 | | | | | 68.6 | |
| COMPARATIVE EXAMPLE 11-1 | Sn | ABSENT | 20 | PRESENT | 68.0 | 1.809 |
| COMPARATIVE EXAMPLE 11-2 | | | | | 67.8 | |
| COMPARATIVE EXAMPLE 11-3 | | | | | 66.5 | |
| COMPARATIVE EXAMPLE 11-4 | | | | | 65.0 | |
| COMPARATIVE EXAMPLE 11-5 | | | | | 63.8 | |

TABLE 12

| | ANODE ACTIVE MATERIAL | LITHIUM CARBONATE COATING | AMOUNT OF INSERTED Li (%) | REMAINING Li | CAPACITY RETENTION RATIO (%) | STANDARD DEVIATION |
|---|---|---|---|---|---|---|
| EXAMPLE 12-1 | Sn | PRESENT | 30 | PRESENT | 78.3 | 0.396 |
| EXAMPLE 12-2 | | | | | 77.8 | |
| EXAMPLE 12-3 | | | | | 77.6 | |
| EXAMPLE 12-4 | | | | | 77.4 | |
| EXAMPLE 12-5 | | | | | 77.3 | |
| COMPARATIVE EXAMPLE 12-1 | Sn | ABSENT | 30 | PRESENT | 77.5 | 1.832 |
| COMPARATIVE EXAMPLE 12-2 | | | | | 77.0 | |
| COMPARATIVE EXAMPLE 12-3 | | | | | 75.1 | |
| COMPARATIVE EXAMPLE 12-4 | | | | | 74.0 | |
| COMPARATIVE EXAMPLE 12-5 | | | | | 73.3 | |

It was obvious from Tables 9 through 12 that in Examples 9-1 through 9-5, 10-1 through 10-5, 11-1 through 11-5 and 12-1 through 12-5, as in the case of Examples 1-1 through 1-5, a higher capacity retention ratio was obtained, and the degree of the variations was smaller, compared to Comparative Examples 9-1 through 9-5, 10-1 through 10-5, 11-1 through 11-5 and 12-1 through 12-5 in which no inactivation process was carried out. Moreover, the smaller the amount of lithium inserted into the anode 10 in advance was, the smaller the variations in the capacity retention ratio were. In other words, it was found out that in the case where tin was used as the anode active material, the same effects as those in the case where silicon was used could be obtained.

Although the present invention is described referring to the embodiment and the examples, the invention is not specifically limited to the above embodiment and the above examples, and is variously modified. For example, in the above embodiment and the examples, the case where a polymeric material is used as a holding body of the electrolyte is described; however, an inorganic conductor such as lithium nitride or lithium phosphate may be used as a holding body, and a mixture of a polymeric material and an inorganic conductor may be used.

Moreover, in the above embodiment and the above examples, the anode 10 in which the anode active material layer 12 is formed on the anode current collector 11 is described; however, any other layer may be formed between the anode current collector and the anode active material layer.

Further, in the above embodiment and the above examples, the coin type secondary battery and the spirally wound laminate type secondary battery are described; however, the invention is also applicable to secondary batteries with a cylindrical shape, a prismatic shape, a button shape, a thin shape, a large shape and a laminate shape in a like manner. Moreover, the invention is applicable to not only the secondary batteries but also primary batteries.

Obviously many modifications and variations of the present invention are possible in the light of the above teachings. It is therefore to be understood that within the scope of the appended claims the invention may be practiced otherwise than as specifically described.

What is claimed is:

1. An anode comprising:
an anode current collector;
an anode active material layer on the anode current collector; and a coating including lithium carbonate,
wherein,
an amount of lithium inserted into the anode active material layer before the initial charge is from 5% to 40% of the anode capacity,
the coating including lithium carbonate is formed from the insertion of lithium into the anode active material layer and the inactivation of the active material by an inactivated gas including carbon dioxide, and
the anode active material layer includes at least one kind selected from the group consisting of simple substances, alloys and compounds of (a) silicon, (b) germanium and (c) tin.

2. An anode comprising:
an anode current collector;
an anode active material layer on the anode current collector formed by at least one method selected from the group consisting of a vapor-phase deposition method, a liquid-phase deposition method and a sintering method; and
a coating including lithium carbonate ,
wherein,
an amount of lithium inserted into the anode active material layer before initial charge is from 5% to 40% of the anode capacity,
the lithium carbonate is formed from the insertion of lithium into the anode active material layer and the inactivation of the active material by an inactivated gas including carbon dioxide, and
the anode active material layer includes at least one kind selected from the group consisting of simple substances, alloys and compounds of (a) silicon, (b) germanium and (c) tin.

3. An anode according to claim 2 wherein lithium is inserted through depositing lithium metal by a vapor phase deposition method.

4. An anode according to claim 2, wherein the coating including lithium carbonate is formed through inserting lithium into the anode active material layer, and then bringing the anode active material layer into contact with carbon dioxide.

5. A battery comprising:
a cathode;
an anode; and
an electrolyte,
wherein,
the anode comprises an anode current collector, an anode active material layer on the anode current collector and a coating including lithium carbonate,
an amount of lithium inserted into the anode active material layer before initial charge is from 5% to 40% of the anode capacity,
the coating including lithium carbonate is formed from the insertion of lithium into the anode active material layer and the inactivation of the active material by an inactivated gas including carbon dioxide, and
the anode active material layer includes at least one kind selected from the group consisting of simple substances, alloys and compounds of (a) silicon, (b) germanium and (c) tin.

6. A battery comprising:
a cathode;
an anode; and
an electrolyte,
wherein,
the anode comprises: (a) an anode current collector, (b) an anode active material layer on the anode current collector formed by at least one method selected from the group consisting of a vapor-phase deposition method, a liquid-phase deposition method and a sintering method, and (c) a coating including lithium carbonate,
an amount of lithium inserted into the anode active material layer before initial charge is from 5% to 40% of the anode capacity,
the coating including lithium carbonate is formed from the insertion of lithium into the anode active material layer and the inactivation of the active material by an inactivated gas including carbon dioxide, and
the anode active material layer includes at least one kind selected from the group consisting of simple substances, alloys and compounds of (a) silicon, (b) germanium and (c) tin.

7. A battery according to claim 6, wherein in the anode active material layer, electrochemically active lithium remains after discharge.

8. A battery according to claim 6, wherein the coating including lithium carbonate is formed through inserting lithium into the anode active material layer, and then bringing the anode active material layer into contact with carbon dioxide.

* * * * *